United States Patent
Lazzaro et al.

(10) Patent No.: US 7,970,741 B2
(45) Date of Patent: Jun. 28, 2011

(54) COMBINING REVISION BASED AND TIME BASED FILE DATA PROTECTION

(75) Inventors: Christopher V. Lazzaro, Austin, TX (US); Thomas E. O'Brien, Round Rock, TX (US); Borna Safabakhsh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/649,792

(22) Filed: Dec. 30, 2009

(65) Prior Publication Data

US 2010/0121819 A1    May 13, 2010

Related U.S. Application Data

(63) Continuation of application No. 11/734,359, filed on Apr. 12, 2007, now Pat. No. 7,720,819.

(51) Int. Cl.
*G06F 7/00* (2006.01)
*G06F 17/00* (2006.01)

(52) U.S. Cl. .......................... 707/663; 707/666; 707/695

(58) Field of Classification Search .................. 707/661, 707/662, 663, 664, 665, 666, 999.2, 999.203, 707/999.204, 694, 695
See application file for complete search history.

(56) References Cited

U.S. PATENT DOCUMENTS

| | | | |
|---|---|---|---|
| 5,564,037 A | 10/1996 | Lam | |
| 5,924,102 A | 7/1999 | Perks | |
| 5,963,961 A | 10/1999 | Cannon et al. | |
| 6,799,251 B1 | 9/2004 | Jacobs et al. | |
| 2003/0046270 A1 | 3/2003 | Leung et al. | |
| 2003/0166399 A1 | 9/2003 | Tokkonen et al. | |
| 2003/0177149 A1 | 9/2003 | Coombs | |
| 2003/0225801 A1 | 12/2003 | Devarakonda et al. | |
| 2004/0093361 A1 | 5/2004 | Therrien et al. | |
| 2004/0172512 A1 | 9/2004 | Nakanishi et al. | |
| 2005/0131990 A1 | 6/2005 | Jewell | |
| 2005/0144186 A1 | 6/2005 | Hesselink et al. | |
| 2006/0010150 A1 | 1/2006 | Shaath et al. | |
| 2007/0027935 A1 | 2/2007 | Haselton et al. | |
| 2008/0154979 A1 | 6/2008 | Saitoh et al. | |

*Primary Examiner* — James Trujillo
*Assistant Examiner* — Marc Somers
(74) *Attorney, Agent, or Firm* — Yee & Associates, P.C.; Jeffrey S. LaBaw

(57) ABSTRACT

A method and apparatus for protecting file data is provided that combines or merges revision based backup with backup based on time intervals. One embodiment is directed to a method for protecting data contained in a file of a computer system, wherein the computer system is useable to create multiple successive file versions. The method comprises the steps of specifying a maximum number of file versions that can be stored collectively at first and second storage locations, and apportioning the maximum number into a first number of file versions and a second number of file versions. The method further comprises storing the most recent of the multiple file versions, up to a number equal to the first number, at the first storage location. A number of file versions respectively created before the stored most recent versions, up to a number equal to the second number, are stored at the second storage location, over a pre-specified time period and in accordance with a pre-specified strategy.

20 Claims, 3 Drawing Sheets

COMBINING REVISION BASED AND TIME BASED FILE DATA PROTECTION

This application is a continuation of U.S. patent application Ser. No. 11/734,359 now U.S. Pat. No. 7,720,819, filed Apr. 12, 2007, status issued May 18, 2010.

BACKGROUND OF THE INVENTION

1. Field of the Invention

The invention disclosed and claimed herein generally pertains to an improved method and apparatus for providing continuous data protection for files in computers and data processing systems. More particularly, the invention pertains to a method of the above type that uses a combination of both revision based and time based techniques to provide continuous protection for computer file data. Even more particularly, the invention pertains to a method of the above type wherein users are enabled to easily select different file protection strategies, in order to accommodate widely varying protection requirements for different types of files.

2. Description of the Related Art

Businesses are increasingly concerned with protecting their computer data. Losing key business information can hamper productivity, cause application outages, and result in project delays and diversion of resources. Many businesses are also legally required to formally deploy data protection. In addition, data residing in work stations and laptops is frequently unprotected, even though such data can amount to 60-70% of data used by businesses such as law firms, medical practices and consulting firms. In these types of enterprises, loss of data can be particularly significant in impacting productivity and viability.

At present, a common approach for protecting data in computers and data processing systems is to back up data on a scheduled basis, at pre-specified time intervals. For example, at the end of a specified period, such as the end of each work day or work week, backup copies are made of particular data files, and the copies are placed into cache storage. Data protection systems made by companies such as IOMEGA Corporation and MICROSOFT Corporation operate according to this type of pre-scheduling. However, it often happens that the most valuable files are those that a user is currently working on. For files of this type, it can frequently become necessary to access a backup file copy that is more recent than the last backup copy that was made on a prescheduled basis. For example, numerous changes could have been made to a file since the last scheduled backup.

To meet this need, continuous data protection techniques have been developed. In a continuous data protection system, backup copies are generated in response to data revisions, rather than at prescheduled times. In systems of this type, whenever changes made to a file are saved, thereby creating a new file version, a backup copy of the new version is immediately created, and then moved to cache storage. One example of systems of this type is the Tivoli® CONTINUOUS DATA PROTECTION (CDP) System of INTERNATIONAL BUSINESS MACHINES Corporation (IBM). In revision based CDP systems, all of the most recent versions of a file are continuously stored in a cache memory, up to a pre-specified maximum number. When the maximum number is reached, the oldest stored version is removed from the cache, to make room for the newest version.

Notwithstanding the benefits of revision based CDP systems as described above, such systems generally do not allow file protection procedures to be adapted by a user, in order to meet different needs for different types of files. Systems that back up files on fixed time schedules, as likewise described above, do not provide such flexibility. However, requirements for retaining prior file versions can vary widely for different types of files. For example, keeping previous versions of financial data files can be very important, whereas previous versions of emails may be of little or no importance. Some files may be revised frequently, while others are seldom or never revised. Moreover, it is generally not desirable to use storage capacity to retain file versions that are redundant, or that do not need to be saved for other reasons. In revision-based CDP, some users save often, in an effort to be careful with their data, but ultimately destroy their revision history. Accordingly, a more flexible solution is necessary to meet more advanced requirements that are common today. It would be very advantageous to provide a file protection system that could be selectively adapted or adjusted, in order to meet different backup requirements for different types of files.

SUMMARY OF THE INVENTION

Embodiments of the invention generally pertain to a method and apparatus for file data protection that combines or merges revision based backup with backup that is based on a period of time. One embodiment of the invention is directed to a method for protecting data contained in a file of a computer system, wherein the computer system is useable to create multiple successive file versions. The method comprises the steps of specifying a maximum number of file versions that can be stored collectively at first and second storage locations, and apportioning the maximum number into a first number of file versions and a second number of file versions. The method further comprises storing the most recent of the multiple file versions, up to a number equal to the first number, at the first storage location. A number of file versions respectively created before the stored most recent versions, up to a number equal to the second number, are stored at the second storage location, over a pre-specified time period and in accordance with a pre-specified strategy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
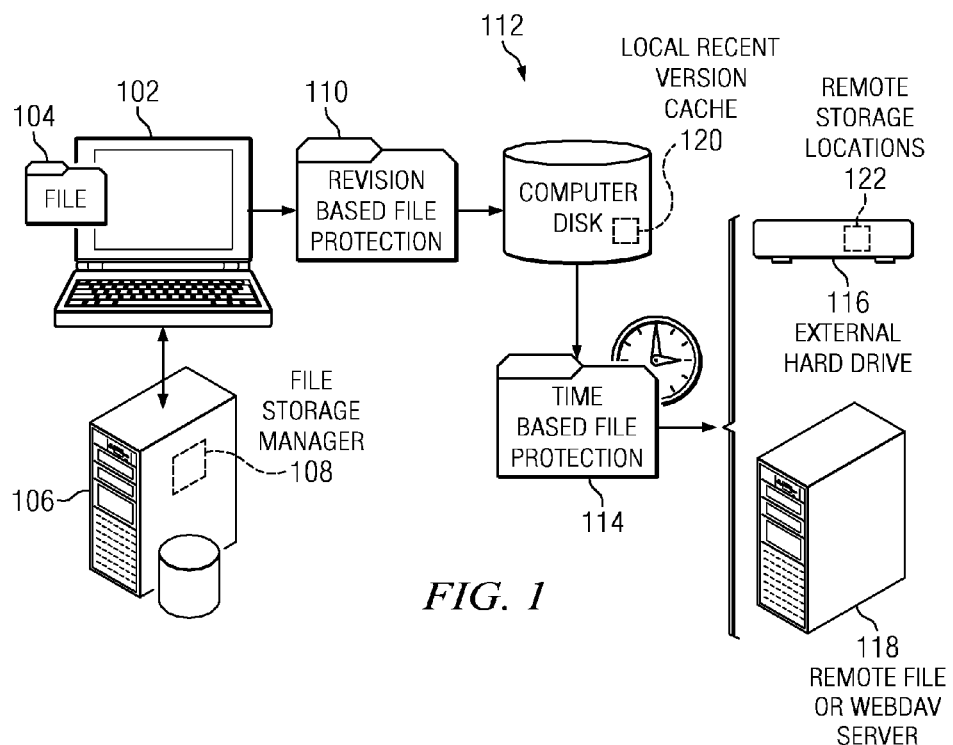
FIG. 1 is a schematic diagram showing respective components for an embodiment of the invention.

Referring to FIG. 1, there is shown a computer or data processing system 102 that may be of virtually any type. Computer 102 is exemplified in FIG. 1 as a laptop computer by way of illustration, but is by no means limited thereto. Computer 102 is capable of generating files of many different kinds that each contain data, wherein all such files can be revised or changed over time. It is therefore necessary to provide means for protecting the current versions of these files. In addition, it is necessary to protect earlier versions of some or many of the files, in case the earlier versions must be referred to at some time in the future. As described above, different types of files can have very different protection requirements. Accordingly, it would be beneficial to differentiate between different file types in providing file protection, so that versions of some files would be retained, without expending resources to save file versions of other files that were not important. It could also be beneficial to adapt file retention practices to the comparative frequency with which changes are made to different file types.

To accommodate these respective needs, a server 106 is provided with a file storage manager 108, wherein manager 108 operates in accordance with an embodiment of the invention. More specifically, manager 108 is interconnected to computer 102, and directs the protective storage of file versions for different files. For a particular file 104, a total or maximum number of current and prior versions that can be saved is specified, such as by a default condition or by user selection. As described hereinafter in further detail, a portion of this maximum number is assigned or allocated to a revision based file protection mode. Thereafter, versions of the file resulting from successive saved changes, up to the allocated number, are continuously stored in a local recent version cache 120, such as in disc 112 of computer 102.

After the allocated number of versions has been stored in the recent version cache 120 in disc 112, generating another file version to be saved causes the oldest cached version to be removed or rolled out from the cache 120. This and subsequent file versions outputted from cache 120 in disc 112 are then stored using a time based file protection mode 114. As described hereinafter in further detail, these file versions will be selectively stored in an external cache location 122, for a pre-specified period of time and using a pre-specified cache strategy. FIG. 1 shows cache 122 contained in an external drive 116, although the cache 122 could be contained in a remote file or WebDav Web-server 118. As is known, WebDav is an abbreviation for Web-based Distributed Authoring and Versioning.

In an example illustrating the embodiment of FIG. 1, it is determined that a maximum of 50 versions of a file 104 can be cached at protective version storage positions, for a period of 2 years. It is further determined that 20% of the maximum number, or 10 version storage positions, is to be used for revision based file protection 110. The remainder, or 40 cache locations, will then be used for time based file protection 114. Thus, the first 10 updated versions of the file 104, up to 10 versions, are continuously moved to positions in recent version cache 120, located in local disc 112. When an $11^{th}$ updated version is created, this version is likewise moved to the local recent version cache 120. Therefore, the $1^{st}$ version to be placed in the recent version cache 120, which is now the oldest version therein, must be removed from the local cache 120 to make room for the $11^{th}$ version. Accordingly, the $1^{st}$ version is moved to an external time based cache 122, located in external hard drive 116. Thereafter, the 10 most recent versions or revisions of the file 104 will always be retained at the recent version cache 120, usefully located at disc 112.

As additional versions of the file 104 are created and moved to the most recent cache 120, an equal number of older versions are moved from such cache location to join the $1^{st}$ version at external time based cache location 122. In a useful embodiment of the invention, when the cache location 122 reaches its maximum allowed capacity of 40 versions, a pre-specified cache strategy is implemented, such as by operation of file storage manager 108. Generally, the cache strategy will spread out or distribute the maximum number of versions allowed, for a particular file, over the time period specified for the file. The cache strategy will determine which versions to respectively retain in, and which versions to remove, from time base cache 122, in order to realize a particular retention goal or retention policy for the file. Moreover, cache strategies may be readily adapted or designed to implement different retention procedures for different files or types of files.

It is thus seen that embodiments of the invention can provide great flexibility in file retention or back up. In one example, files in the time base cache could be retained so that they are linearly distributed over the time period. This could be achieved by saving one file version in the time based cache for each of a number of equal intervals spread over the time period. However, in other examples, distribution of saved versions over the time period would be skewed, so that a greater number of newer file versions were saved, and a comparatively small number of older versions were saved. An example of this would be a logarithmic distribution, described hereinafter in further detail in connection with FIG. 2. On the other hand, distribution could be skewed over the time period so that comparatively more older versions were saved than newer versions. This might be done, for example, if older versions of the file had been modified much more frequently than newer versions.

Cache strategies, and decisions to retain particular file versions in the time based cache, can be further influenced by factors such as the frequency with which changes are made to a file, and the comparative importance of a file. It may also be desirable to use length of a file document as a factor, if different versions have significantly different lengths. Thus, a shorter version could be saved rather than the longer version, in order to save storage space. However, it is to emphasized that within the scope of the invention, numerous criteria and considerations, in addition to those disclosed herein, could be used in designing the cache strategy for a particular file. Accordingly, embodiments of the invention are not limited to the examples set forth above.

If a version is retained in the time based cache until it reaches the end of the time period, from the date of its creation, such retained version will then generally expire.

In a further example of a linear arrangement, a succession of intervals of equal time length are defined, such as intervals comprising successive daily, weekly, or monthly periods. At the end of a particular linear interval the most recent version, of all versions received or otherwise available at external cache 122 during the particular interval, is saved.

It will, of course, be appreciated that in other embodiments of the invention, file versions stored according to both the revision and time based procedures can all be stored locally, or can all be stored at the same or different external locations. Moreover, in some embodiments, instead of providing a specified maximum number of versions that can be stored, a maximum amount of storage space or capacity would be specified. Percentages of the storage space would be allocated to both recent version cache storage, and time based cache storage, respectively. The actual numbers of file versions that could be stored would then depend on the size length of respective versions.

For many types of files, it will typically be the case that a difference of, for example, 5 days between file versions will be much more important for files stored the previous month, than for files that were stored more than a year previously. For files of such types, it could be preferable to have a cache strategy that uses a logarithmic relationship in selecting intervals for the time interval based storage, rather than a linear relationship as discussed above. As used herein, the term "logarithmic relationship" is used to mean a succession of intervals for storing file versions, wherein intervals become longer, or shorter, over time.

Figure 2:
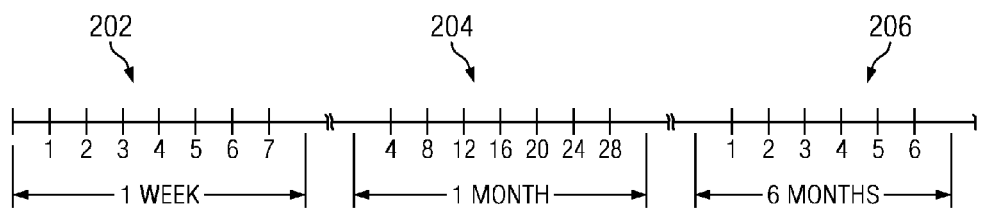
FIG. 2 is a timeline that further illustrates an embodiment of the invention.

Referring to FIG. 2, there is shown a time scale depicting a logarithmic arrangement or strategy for caching file versions over logarithmic time intervals, that increase in length over time. More particularly, FIG. 2 shows that file versions received at external time based cache 122 in FIG. 1 are stored for a one week period 202, during time intervals of one day in duration. During the following period 204, which is of one month duration, successive version storage intervals are each two days in length. A third period 206 has a duration of six months, and file versions are stored at one week intervals.

By providing the capabilities described above, a system can be readily adapted to meet widely varying backup requirements for different types of files. The adaptation can be simply carried out, by enabling a user to select parameter values that would be applied to protect a particular file. These parameter values can include (1) the total period of time that file versions are to be saved; (2) the maximum or total number of versions that can be stored; and (3) the percentages used for allocating the maximum number of versions between revision based and time interval based storage. In addition, the user can select a cache strategy that will determine the types of intervals to be used for storing versions over time. The intervals could, for example, be linear or have logarithmic relationships as discussed above.

As an additional feature, a user can be provided with tags for designating the relative importance of different stored file archives or single files, (e.g., Mozart.mp3) or files of a specific extension (e.g. *.mp3), or files of a specific category (e.g. music files). Usefully, the tags are selected to indicate that a particular file archive has either a high, medium or low protection priority. For example, files containing configuration parameters or financial data could have high priorities, while attachments to emails would have low priority.

Examples of settings for parameter values as described above, for different types of files, are set forth in a table shown below:

| Resource Location | Tag | No. of Versions | Time Period | File Types |
|---|---|---|---|---|
| Local Drives | High priority | 100 | 2 years | Configuration parameters, financial data |
| Local Drives | Low priority | 1 | 1 week | Email attachments |
| Local Drives | Medium priority | 50 | 6 months | Email archive |

After entering file protection parameter values such as those shown into the server 106 of FIG. 1, file storage manager 108 is operable to provide continuous data protection for the corresponding files. In addition, a further feature can be used to determine how often specific files or types of files are accessed, and the frequency with which they are changed or modified. This feature is implemented by monitoring selected files over time, in order to track the number of changes made thereto. Information furnished by this feature can then be employed to dynamically adjust parameter settings, when using embodiments of the invention to protect files. For example, if the furnished information indicates that a particular file is frequently changed and accessed, it could be decided to allocate a large number of versions for file backup. In some embodiments, a formula could be used to relate usage directly to the number of backup versions that are allocated.

Figure 3:
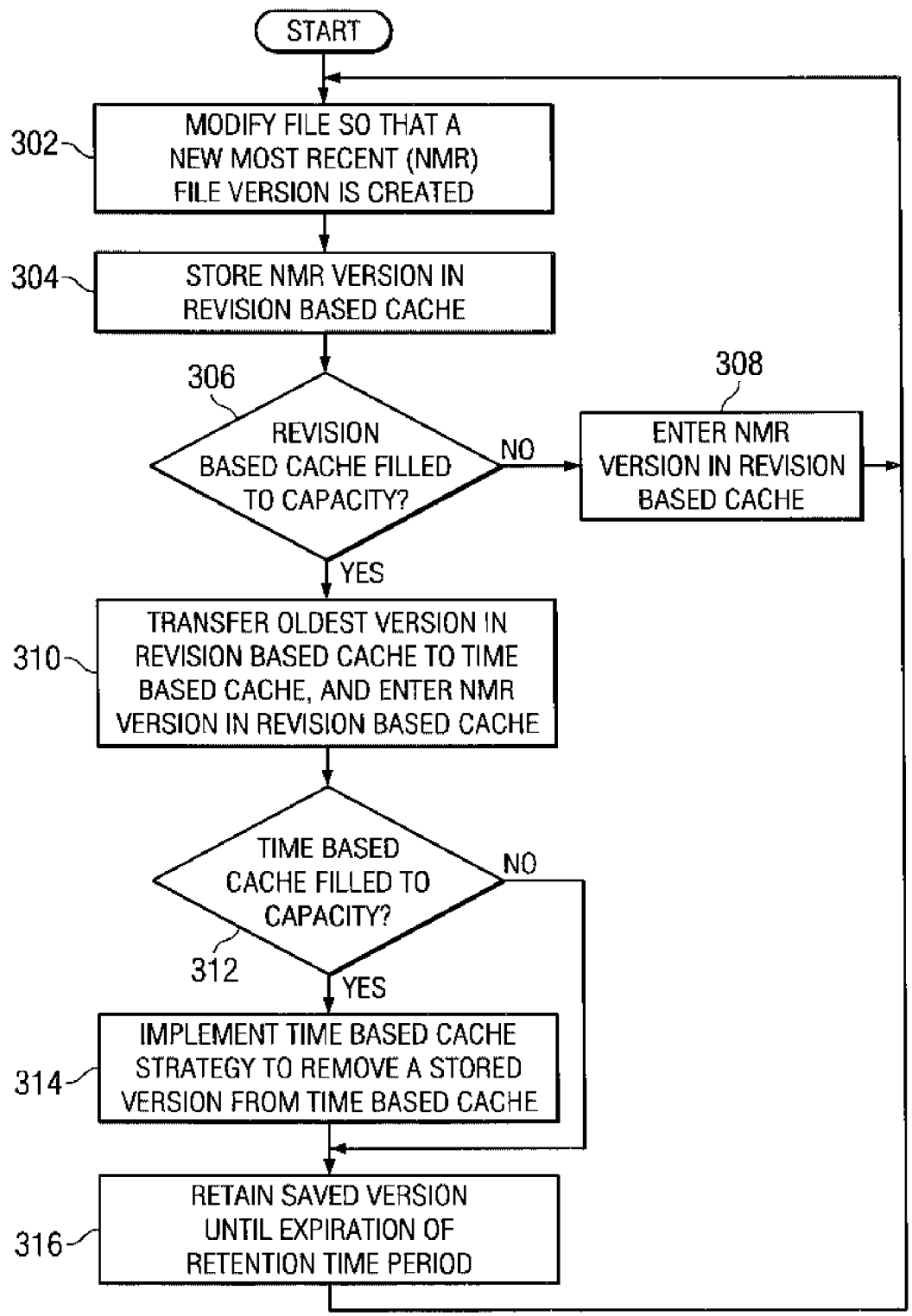
FIG. 3 is a flowchart showing steps for implementing an embodiment of the invention.

FIG. 3 shows principal steps for implementing an embodiment of the invention, which may for example be carried out by file storage manager 108 of server 106. FIG. 3 is more particularly directed to a logarithmic cache strategy as described above, only for purposes of illustration and not limitation. At step 302, a file modification is saved, so that a new most recent (NMR) file version is created and must be backed up. Accordingly, at step 304 it is determined to store the (NMR) version in a revision based cache, such as cache 120 in computer disc 112 of FIG. 1. As indicated by steps 306 and 308, this can be readily done if the revision based cache is not yet filled to the maximum number of file versions apportioned thereto. However, if the revision based cache is filled to capacity, step 310 shows that the oldest version therein must be moved to the time interval based cache, such as cache 122, so that the (NMR) file version can be entered into the revision based cache.

At step 312, it must be determined whether the time based cache is filled to capacity. If not, the time based cache can simply continue to receive one or more versions from the revision based cache. If the time based cache becomes filled, the time cache based strategy is implemented, as shown by step 314. As shown by step 316, each saved version expires upon reaching the end of the time period, regardless of whether it is saved in the time based cache or the revision based cache.

As an additional feature in embodiments of the invention, retrieval of saved versions is made to be seamless, with respect to both the revision based cache and the time based cache. More particularly, versions in the revision based cache will typically be referenced by means of a version number, whereas versions in the time based cache will be referenced by means of a time date stamp. Accordingly, a mechanism is included that is responsive to requests for version retrieval using either type of reference. If a request is submitted to retrieve a particular numbered version, the time based cache will be searched as well as the revision based cache, in order to locate and retrieve the desired version. Similarly, if a retrieval request identifies a version by its time of creation, the revision based cache as well as the time based cache will be searched, in order to locate such version.

In an example illustrating this capability, it is assumed that the revision based cache stores the last 10 file versions, which in fact extend back over the last 6 months. Also, versions 12, 14, 16, and 18, which extend back over the last two years, are stored in the time based cache. If a user submits a request to retrieve file version 8, clearly this would come from the revision based cache. However, if the request was for version 14, the mechanism would still locate and retrieve such version, since the mechanism is configured to search both caches for a version number.

Similarly, if a user submits a request to retrieve a version created 1.5 years ago (which was version 16), such version would be located and retrieved from the time based cache. If the request was for a version created 3 months ago (which was version 9), the mechanism would locate and retrieve this version from the revision based cache, since the mechanism is configured to search both caches by date and time stamp.

Figure 4:
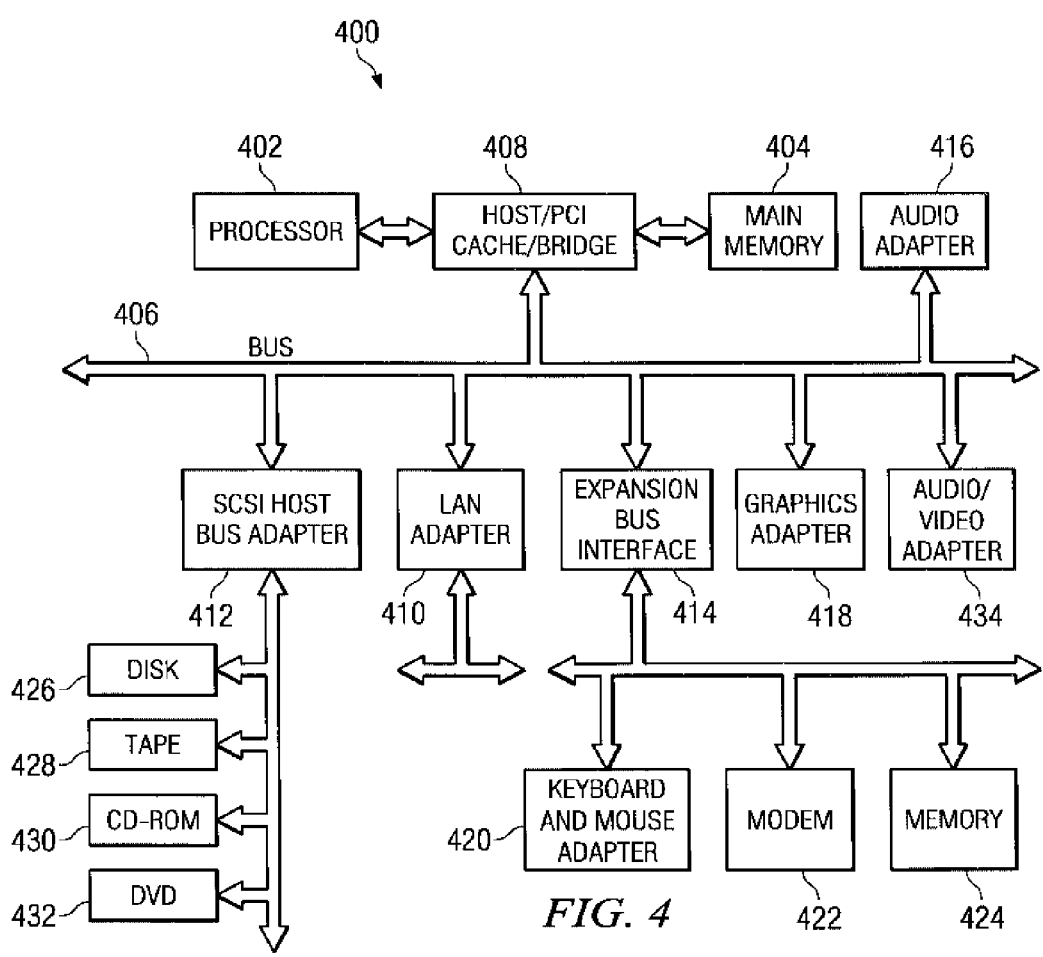
FIG. 4 is a block diagram showing a data processing system that may be used in implementing in an embodiment of the invention.

Referring to FIG. 4, there is shown a block diagram of a data processing system 400 in which aspects of the present invention may be implemented. More particularly, data processing system 400 is an example of a computer which may be adapted for use as server 106 in FIG. 1, to implement file storage manager 108, and in which computer usable code or instructions for implementing processes for embodiments of the present invention may be located. System 400 employs a peripheral component interconnect (PCI) local bus architecture, although other bus architectures, such as Micro Channel and ISA, may alternatively be used.

Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. Audio adapter 416, graphics adapter 418, and audio/video adapter (A/V) 434 are connected to PCI local bus 406 by add-in boards inserted into expansion slots. Expansion bus interface 414 provides a connection for a keyboard and mouse adapter 420, modem 422, and additional memory 424.

In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within system 400 of FIG. 4. The operating system may be a commercially available operating system, such as OS/2, which is available from International Business Machines Corporation.

Those of ordinary skill in the art will appreciate that the hardware in FIG. 4 may vary depending on the implementation. The depicted example is not meant to imply architectural limitations with respect to the present invention. For example, the processes of the present invention may be applied to multiprocessor data processing systems.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for protecting data contained in a specified file of a computer system, wherein the computer system is usable to create multiple successive versions of the specified file, said method comprising:

specifying a maximum number of said versions of said specified file that can be stored collectively at first and second storage locations;

apportioning said maximum number into a first number of versions of said specified file, and a second number of versions of said specified file, wherein said maximum number is equal to the sum of said first and second numbers;

enabling a user of said system to select said maximum number of versions of said specified file, said first number of said specified file, and said second number of said specified file; and wherein multiple unique files and multiple unique file types are individually selectable and each have their own maximum number of versions and their own first and second numbers;

storing the most recent versions of said specified file, up to a number equal to said first number, and in accordance with a first pre-specified strategy, at said first storage location; and storing versions of said specified file respectively created before said stored most recent versions, up to a number equal to said second number, over a pre-specified time period, and in accordance with a second pre-specified strategy, at said second storage location.

2. The method of claim 1, wherein:
said pre-specified strategy includes determining whether two versions of a file stored at said storage location have lengths that are different from one another, and if so, deleting the version with the longer length from said storage location.

3. The method of claim 1, wherein:
said versions stored at said storage location are linearly distributed over said pre-specified time period.

4. The method of claim 1, wherein:
said versions stored at said storage location are distributed over said pre-specified time period during intervals that vary in length, in accordance with a pre-specified relationship.

5. The method of claim 4, wherein:
said pre-specified relationship comprises a logarithmic relationship.

6. The method of claim 5, wherein:
said method includes determining the frequency at which said successive file versions are created, and using said frequency to dynamically adjust said maximum number of file versions, said first number, and said pre-specified time interval, selectively.

7. The method of claim 5, wherein:
a tag is provided to indicate an importance value associated with protecting respective versions of said file, wherein said importance value is used in determining said maximum number of file versions, said first number of file versions, and said pre-specified time period, selectively.

8. The method of claim 7, wherein:
said tag indicates whether said importance value for said file is high, medium, or low importance value, selectively.

9. The method of claim 1, wherein:
said first and second storage locations each comprises either a local or external storage location, selectively.

10. The method of claim 9, wherein:
different referencing techniques are used in connection with versions stored in said first and second storage locations, respectively, and a version stored in either location can be located and retrieved using either referencing technique.

11. The method of claim 1, wherein:
a maximum amount of storage space is specified for storing respective versions of said file, and said specified maximum number of file versions is determined from said maximum amount of storage space.

12. The method of claim 1, wherein:
said method is implemented by a file storage manager associated with said computer system, wherein said file storage manager receives a set of parameter input values that collectively provide said maximum number of file versions, said first and second numbers, the lengths of said intervals, and a specified time period until respective stored file versions expire.

13. A computer program product stored in a computer readable medium for protecting data contained in a specified file of a computer system, wherein the computer system is usable to create multiple successive versions of the specified file, said computer program product comprising:
first instructions for specifying a maximum number of said specified file versions that can be stored collectively at first and second storage locations;
second instructions for apportioning said maximum number into a first number of said specified file versions and a second number of said specified file versions, wherein said maximum number is equal to the sum of said first and second numbers; and
wherein multiple unique files and multiple unique file types are individually specified and each have their own maximum number of versions and their own first and second numbers;
third instructions for storing the most recent of said multiple file versions, up to a number equal to said first number, and in accordance with a first pre-specified strategy, at said first storage location; and
fourth instructions for storing file versions respectively created before said stored most recent versions, up to a number equal to said second number, over a pre-specified time period, and in accordance with a second pre-specified strategy, at said second storage location.

14. The computer program product of claim 13, wherein:
said pre-specified strategy comprises a time based cache strategy that is adaptable to apply different retention procedures to different files.

15. The computer program product of claim 13, wherein:
the frequency at which said successive file versions are created is determined, and then used to dynamically adjust said maximum number of file versions, said first number, and said pre-specified time interval, selectively.

16. The computer program product of claim 13, wherein:
a tag is provided to indicate an importance value associated with protecting respective versions of said file, wherein said importance value is used in determining said maximum number of file versions, said first number of file versions, and said pre-specified time period, selectively.

17. An Apparatus for protecting data contained in a specified file of a computer system, wherein the computer system is usable to create multiple successive versions of the specified file, said apparatus comprising:
a processor;
a memory device;
a component for specifying a maximum number of said specified file versions that can be stored collectively at first and second storage locations;
a component for apportioning said maximum number into a first number of versions of said specified file and a second number of versions of said specified file, wherein said maximum number is equal to the sum of said first and second numbers; and
wherein multiple unique files and multiple unique file types are individually specified and each have their own maximum number of versions and their own first and second numbers;
a component for storing the most recent of said multiple file versions, up to a number equal to said first number, and in accordance with a first pre-specified strategy, at said first storage location; and
a component for storing file versions respectively created before said stored most recent versions, up to a number equal to said second number, over a pre-specified time period, and in accordance with a second pre-specified strategy, at said second storage location.

18. The apparatus of claim 17, wherein:
said pre-specified strategy comprises a time based cache strategy that is adaptable to apply different retention procedures to different files.

19. The apparatus of claim 17, wherein:
said apparatus includes a component for determining the frequency at which said successive file versions are created, and using said frequency to dynamically adjust said maximum number of file versions, said first number, and said pre-specified time interval, selectively.

20. The apparatus of claim 17, wherein:
a tag is provided to indicate an importance value associated with protecting respective versions of said file, wherein said importance value is used in determining said maximum number of file versions, said first number of file versions, and said pre-specified time period, selectively.

* * * * *